Oct. 23, 1956　　　J. LAMONT　　　2,768,346
TEST FIXTURE FOR RELAYS

Filed March 26, 1953　　　3 Sheets-Sheet 1

INVENTOR
JOHN LAMONT
BY
*W. C. Parnell*
ATTORNEY

Oct. 23, 1956  J. LAMONT  2,768,346
TEST FIXTURE FOR RELAYS
Filed March 26, 1953  3 Sheets-Sheet 2

INVENTOR
JOHN LAMONT
BY W. C. Parnell
ATTORNEY

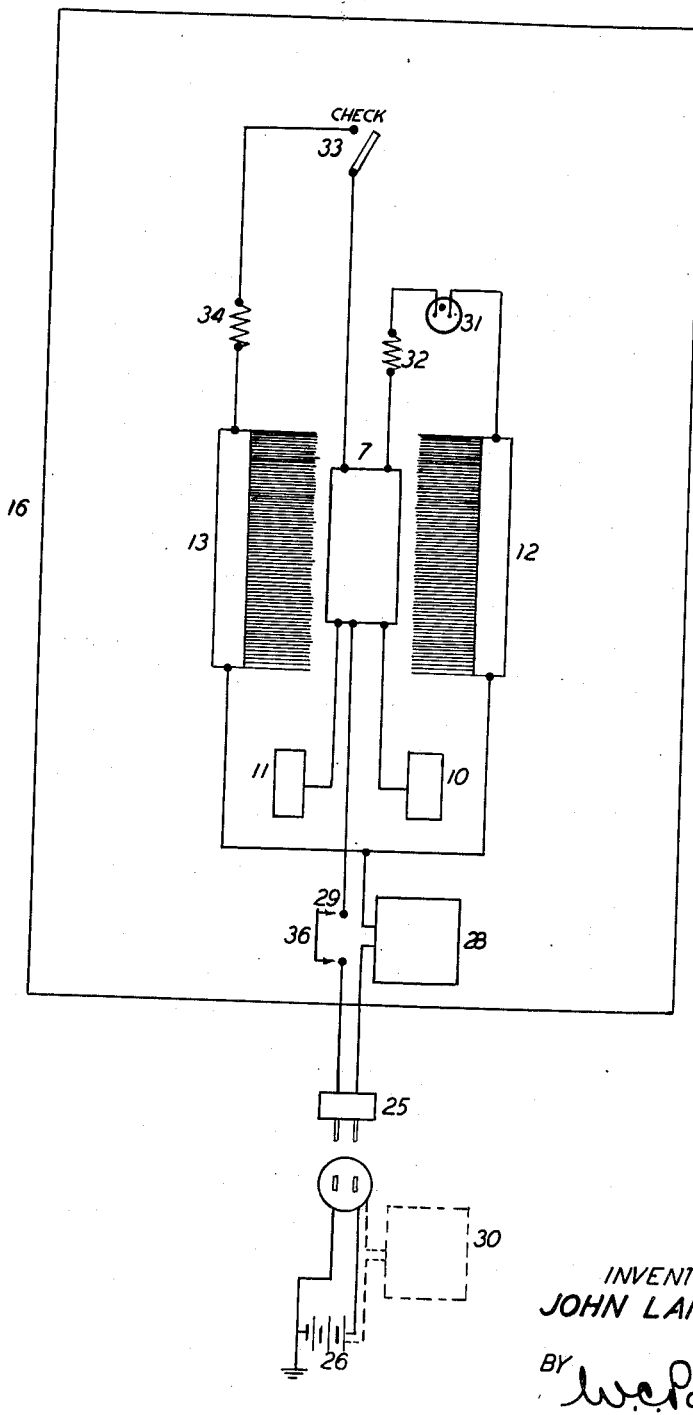

United States Patent Office 2,768,346
Patented Oct. 23, 1956

2,768,346

TEST FIXTURE FOR RELAYS

John Lamont, Belleville, N. J., assignor to Western Electric Company, Incorporated, New York, N. Y., a corporation of New York Application March 26, 1953, Serial No. 344,767

7 Claims. (Cl. 324—28)

This invention relates to a relay testing device and particularly to a fixture for making production line insulation breakdown tests on relays.

In the manufacture of relays having contact spring pile-ups mounted to a frame, it is necessary to check the insulation resistance between each of the contact springs and the relay frame and the insulated mounting screws for the pile-ups.

In testing large quantities of these relays, there has long been a need for a simple test fixture in which a relay can be easily connected in a high potential breakdown circuit and quickly but effectively tested.

It is the principal object of this invention to provide such a fixture which requires very little skill or effort on the part of the operator and which may be used for long periods with minimum maintenance.

In accordance with the general principles of the invention, the fixture comprises a relay frame supporting member, contacting means for the relay contact springs, pile-up screw contacting members electrically connected to the supporting member, guides for positioning a relay dropped onto the support so that the relay spring contacts engage the contacting means therefor and pile-up screws make electrical connection with the contacting members, an electrical circuit for connecting test potential between the relay spring contacting means and the relay frame supporting member and an alarm operated by fault current through a relay in the fixture.

Other objects and features of the invention will be more readily understood from the following detailed description taken in conjunction with the accompanying drawing in which:

Fig. 5 is a schematic diagram of the test circuit for the fixture.

Figure 1:
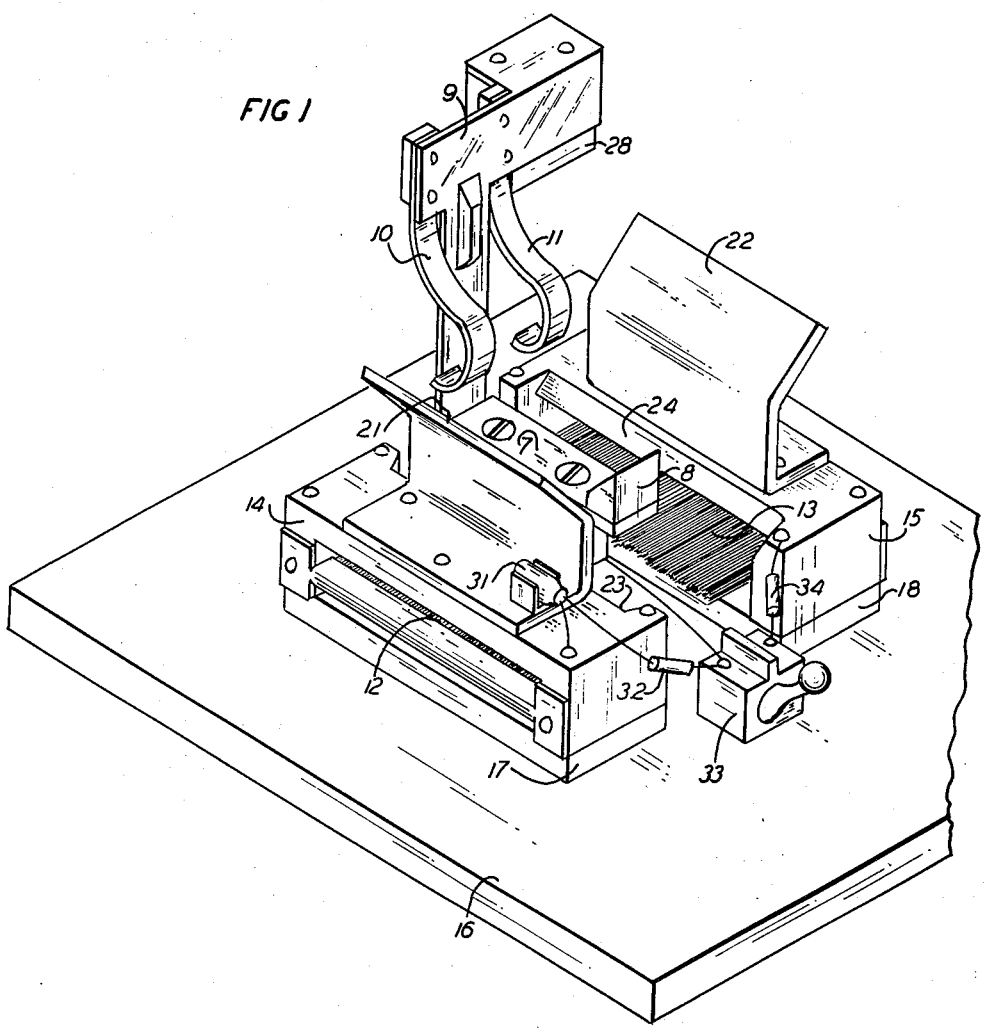
Fig. 1 is an isometric view of a fixture according to the invention.

Referring now to Fig. 1 of the drawing, a relay grounding and support member 7 is provided with a hardened wedge-shaped metal transverse guide 8 mounted on one end thereof. A pile-up screw contacting member 9 having cantilever, screw-contacting, springs 10 and 11 fixed thereto, is also mounted to the support member 7 on the end opposite the guide 8. In addition to performing the principal function of contacting the pile-up screws, these springs also cooperate with guide 8 to position the relay for test and to hold the relay in place during test.

Figure 3:
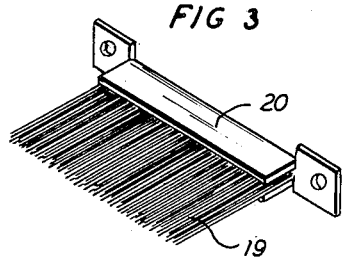
Fig. 3 is an isometric view of one of the wire combs of the fixture of Fig. 1.

Inclined lateral guide plates 21 and 22, also of hardened metal to withstand wear, are supported by members 14 and 15, respectively, to which the wire combs 12 and 13 are mounted. As shown in the detailed view of Fig. 3, each of the combs is comprised of one or more layers of fine, stiff, closely spaced wires 19 and a clamping member 20. The combs are bolted to the support members so that the wires thereof are positioned on either side of the relay support member 7. Members 14 and 15 are insulated from the base plate 16 by insulators 17 and 18, respectively.

When a relay is dropped in the fixture in roughly the right orientation, it first engages one or both of the guides 21 or 22 which insure that the two spring pile-ups on the relay straddle the frame support member 7, the final lateral position of the relay is determined by the edges 23 and 24 of the lateral guide supports 14 and 15, respectively, which spacing is such with respect to support member 7 that none of the relay springs can make contact with the support 7. Due to the small diameter and large number of wires in the combs and their ability to deflect in any direction, all the contact springs of the relay will automatically be connected to the test circuit thereby.

Figure 2:
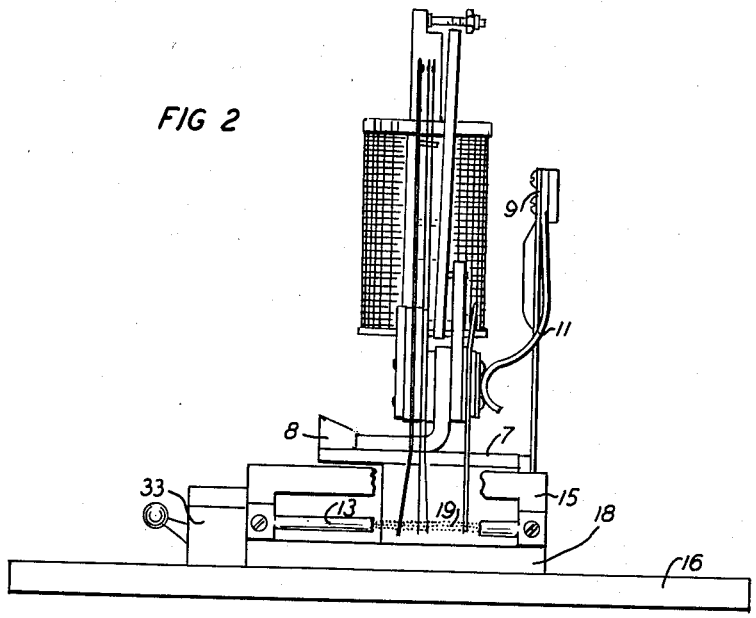
Fig. 2 is a broken side elevational view of the fixture of Fig. 1 with the lateral guides removed and showing a relay in test position.

In the side view of the fixture shown in Fig. 2, a relay is shown mounted in test position. While this relay has but a few contact springs, the wire combs are sufficiently long to accommodate relays having large contact spring pile-ups.

In the schematic diagram of the test circuit shown in Fig. 5, the grounded side of the high voltage test source 26 is connected to the relay frame grounding and support member 7 and the attached pile-up screw contacting springs 10 and 11 through the connecting plug 25 and the lid operated safety switch 29, while the high potential side of the test voltage source is connected to the combs through the plug 25 and a current sensitive alarm 28 of a conventional type. The alarm 28 need not be included in the fixture circuit but may be included in the circuit external thereto between the voltage source 26 and the plug 25 as shown in phantom and designated numeral 30. An operating check circuit, comprising a neon lamp 31 in series with a high resistance element 32, is connected across the combs and the relay frame support member 7, the lamp lighting up when test potential is applied to the fixture to indicate that the circuit is operative. The current drain due to this shunting circuit is insufficient to actuate the alarm. A simulated breakdown or alarm check circuit comprising "check" switch 33 and resistance element 34 is also shunted across the relay support member and the combs, the resistances of this circuit being of such value that minimum operating current for the alarm will flow therein when the "check" switch is thrown.

Figure 4:
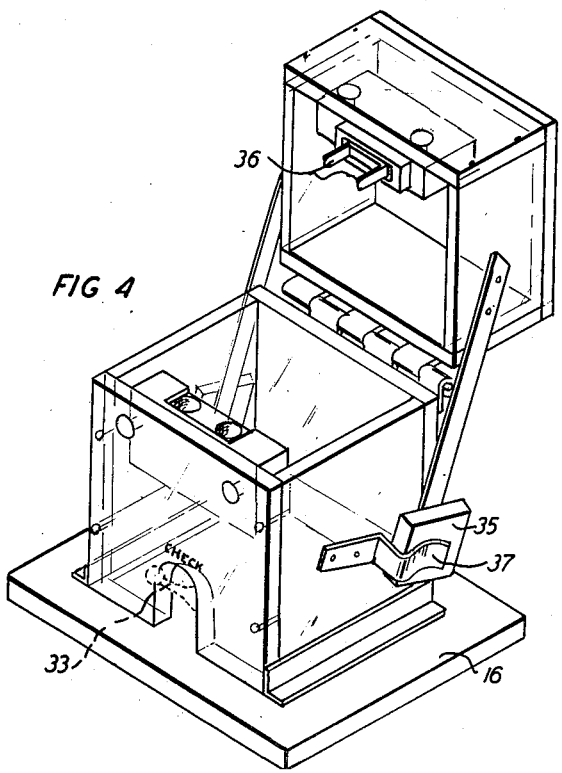
Fig. 4 is an isometric view of the cover for the fixture of Fig. 1.

The protective cover for the fixture shown in Fig. 4 is preferably constructed of a transparent plastic material such as Plexiglas, the shorting strap 36 of the switch 29 being fastened on the lid so that the high potential circuit is open with the lid in its normally open position. Counterweights 35 are mounted to the lid to automatically open it when released from the closed test position after a test has been made on a relay and to hold it in the open position until the next relay has been inserted into the fixture. Friction clips 37 are provided on the case to engage the counterweights when the lid is opened after a test to prevent oscillations of the lid which would slow down testing.

Preliminary to testing relays in the fixture, the operator first plugs the fixture into the source of test potential and then checks the circuit by closing the lid and momentarily throwing the "check" switch to actuate the alarm. If the alarm is actuated, he releases the lid which automatically opens and he then proceeds with the relay testing by inserting a relay into the fixture and closing the lid momentarily, if the alarm is not actuated to indicate a breakdown in the relay being tested, it has passed the test satisfactorily and he removes it from the fixture and inserts the next relay. It at any time while testing relays the neon check lamp fails to light when the lid is closed, the operator is warned thereby that the test potential is not being applied and that the trouble must be cleared before proceeding.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An insulation breakdown testing device for relays having contact spring pile-ups mounted thereon by insulated screws, comprising a relay frame supporting member, contacting means for the relay contact springs, screw contacting members electrically connected to the frame supporting member, guides for positioning a relay dropped onto the support so that the contact springs engage the contacting means therefor and the insulated screws make electrical connection with the contacting members, means for applying test potential between the relay spring contacting means and the relay frame supporting member, an alarm operated by fault current through a relay in the fixture, and a fault simulating circuit comprising a resistance element and means for connecting the resistance element in shunt with the relay frame supporting member and the contacting means for the relay spring contacts.

2. An insulation breakdown testing device for relays having contact spring pile-ups mounted thereon by insulated screws, comprising a relay frame supporting member, contacting means for the relay contact springs, screw contacting members electrically connected to the frame supporting member, guides for positioning a relay dropped onto the support so that the contact springs engage the contacting means therefor and the insulated screws make electrical connection with the contacting members, means for applying test potential between the relay spring contacting means and the relay frame supporting member, an alarm operated by fault current through a relay in the fixture, a neon lamp in series with a high resistance element shunted across the relay frame support member and the contacting means for the relay spring contacts to indicate the application of test potential to the device and a fault simulating circuit comprising a resistance element and means for connecting the resistance element in shunt with the relay frame supporting member and the contacting means for the relay spring contacts.

3. A fixture for insulation breakdown testing of relays having contact spring pile-ups mounted thereon by insulated screws, the fixture comprising a relay frame grounding and supporting member, a wire comb disposed on either side of the member, screw contacting members electrically connected to the frame supporting member, guides for positioning a relay dropped onto the support so that the contact springs engage the comb wires and the insulated screws make electrical connection with the contacting members, means for applying test potential between the combs and the relay frame supporting member and an alarm operated by fault current through a relay in the fixture.

4. A fixture for insulation breakdown testing of relays having contact spring pile-ups mounted thereon by insulated screws, the fixture comprising a relay frame grounding and supporting member, a wire comb disposed on either side of the member, screw contacting members electrically connected to the frame supporting member, guides for positioning a relay dropped onto the support so that the contact springs engage the comb wires and the insulated screws make electrical connection with the contacting members, a cover for the fixture having a lid provided with counter-weighted extension members thereon to hold the lid in a normally open position, clips mounted on the cover for making friction engagement with the counterweighted members when the lid is opened, lid actuated means for applying test potential between the combs and the relay frame supporting member when the lid is closed and an alarm operated by fault current through a relay in the fixture.

5. A fixture for insulation breakdown testing of relays having contact spring pile-ups mounted thereon by insulated screws, the fixture comprising a relay frame grounding and supporting member, a wire comb disposed on either side of the member, screw contacting members electrically connected to the frame supporting member, guides for positioning a relay dropped onto the support so that the contact springs engage the comb wires and the insulated screws make electrical connection with the contacting members, a cover for the fixture having a lid provided with counterweighted extension members thereon to hold the lid in a normally open position, clips mounted on the cover for making friction engagement with the counterweighted members when the lid is opened, lid actuated means for applying test potential between the combs and the relay frame supporting member when the lid is closed, an alarm operated by fault current through a relay in the fixture, and a fault simulating circuit comprising a resistance element and means for connecting the resistance element in shunt with the relay frame supporting member and the wire combs.

6. A fixture for installation breakdown testing of relays having contact spring pile-ups mounted thereon by insulated screws, the fixture comprising a relay frame grounding and supporting member, a wire comb disposed on either side of the member, screw contacting members electrically connected to the frame supporting member, guides for positioning a relay dropped onto the support so that the contact springs engage the comb wires and the insulated screws make electrical connection with the contacting members, a cover for the fixture having a lid provided with counterweighted extension members thereon to hold the lid in a normally open position, clips mounted on the cover for making friction engagement with the counterweighted members when the lid is opened, lid actuated means for applying test potential between the combs and the relay frame supporting member when the lid is closed, an alarm operated by fault current through a relay in the fixture, a neon lamp in series with a high resistance element shunted across the relay frame support member and the wire combs to indicate the application of test potential to the device and a fault simulating circuit comprising a resistance element and means for connecting the resistance element in shunt with the relay frame support member and the wire combs.

7. A fixture for insulation breakdown testing of relays having contact spring pile-ups mounted thereon by insulated screws, the fixture comprising a relay frame grounding and supporting member, a wire comb disposed on either side of the member, screw contacting members electrically connected to the frame supporting member, lateral and transverse guides for positioning a relay dropped onto the support so that the contact springs engage the comb wires and the insulated screws make electrical connection with the contacting members, means for applying test potential between the combs and the relay frame supporting member and an alarm operated by fault current through a relay in the fixture, the lateral guides comprising an inclined metal plate mounted on each side of the relay supporting member and the transverse guides comprising a wedge-shaped member mounted to the relay frame supporting member cooperating with the screw contacting members.

References Cited in the file of this patent

UNITED STATES PATENTS

| | | |
|---|---|---|
| 1,421,587 | Shirk et al. | July 4, 1922 |
| 2,436,415 | Arnold | Feb. 24, 1948 |
| 2,515,623 | Williams et al. | July 18, 1950 |